(12) United States Patent
Kodialam et al.

(10) Patent No.: US 6,996,065 B2
(45) Date of Patent: Feb. 7, 2006

(54) DYNAMIC BACKUP ROUTING OF NETWORK TUNNEL PATHS FOR LOCAL RESTORATION IN A PACKET NETWORK

(75) Inventors: Muralidharan S. Kodialam, Marlboro, NJ (US); Tirunell V. Lakshman, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 879 days.

(21) Appl. No.: 09/899,508

(22) Filed: Jul. 5, 2001

(65) Prior Publication Data

US 2002/0067693 A1   Jun. 6, 2002

Related U.S. Application Data

(60) Provisional application No. 60/216,394, filed on Jul. 6, 2000, provisional application No. 60/239,771, filed on Oct. 12, 2000.

(51) Int. Cl.
*G01R 31/08* (2006.01)

(52) U.S. Cl. ...................................... 370/238; 370/252
(58) Field of Classification Search ................ 370/216, 370/217, 221, 225, 227, 228, 237, 238, 252
See application file for complete search history.

(56) References Cited

U.S. PATENT DOCUMENTS

| | | | | |
|---|---|---|---|---|
| 5,317,566 A | * | 5/1994 | Joshi .......................... | 370/238 |
| 5,590,119 A | * | 12/1996 | Moran et al. ................ | 370/225 |
| 5,999,286 A | * | 12/1999 | Venkatesan .................... | 398/5 |
| 6,026,077 A | * | 2/2000 | Iwata .......................... | 370/254 |
| 6,215,765 B1 | * | 4/2001 | McAllister et al. .......... | 370/217 |
| 6,363,319 B1 | * | 3/2002 | Hsu ............................ | 370/238 |
| 6,507,561 B1 | * | 1/2003 | Baniewicz et al. .......... | 370/216 |
| 6,512,740 B1 | * | 1/2003 | Baniewicz et al. .......... | 370/216 |
| 6,584,071 B1 | * | 6/2003 | Kodialam et al. ........... | 370/238 |
| 6,628,649 B1 | * | 9/2003 | Raj et al. ..................... | 370/360 |
| 6,721,269 B2 | * | 4/2004 | Cao et al. .................... | 370/227 |

OTHER PUBLICATIONS

Weil et al. "Failure Protection in a Communication Network" Jul. 5, 2001.*
Murali Kodialam and T.V. Lakshman, Dynamic Routing of Locally Restorable Bandwidth Granteed Tunnels Using Aggregated Link Usage Information, IEEE INFOCOM 2001, pp. 376-385.*
Murali Kodialam and T.V. Lakshman, Dynamic Routing of Locally Restorable Bandwidth Granteed Tunnels with Restoration,Proceesings of Infocom 2000, Mar. 2000.*

* cited by examiner

*Primary Examiner*—Seema S. Rao
*Assistant Examiner*—Puneet Bhandari

(57) ABSTRACT

A packet network of interconnected nodes employing dynamic backup routing of a Network Tunnel Path (NTP) allocates an active and backup path to the NTP based upon detection of a network failure. Dynamic backup routing employs local restoration to determine the allocation of, and, in operation, to switch between, a primary/active path and a secondary/backup path. Switching from the active path is based on a backup path determined with iterative shortest-path computations with link weights assigned based on the cost of using a link to backup a given link. Costs may be assigned based on single-link failure or single element (node or link) failure. Link weights are derived by assigning usage costs to links for inclusion in a backup path, and minimizing the costs with respect to a predefined criterion.

40 Claims, 3 Drawing Sheets

INFORMATION FLOW

- - -▷ POTENTIAL BACKUP PATHS FOR LINK (k,l)
⇒ LINKS IN THE CURRENT SHORTEST PATH TREE

DYNAMIC BACKUP ROUTING OF NETWORK TUNNEL PATHS FOR LOCAL RESTORATION IN A PACKET NETWORK

CROSS-REFERENCE TO RELATED APPLICATIONS

This application claims the benefit of the filing date of U.S. provisional application Nos. 60/216,394, filed on Jul. 6, 2000, and 60/239,771, filed on Oct. 12, 2000.

BACKGROUND OF THE INVENTION

1. Field of the Invention

The present invention relates to routing packets in a telecommunications network, and, more particularly, to determining paths through nodes of the network for dynamic backup routing of packets for restoration.

2. Description of the Related Art

In interconnected packet networks, such as the Internet, users establish a connection between a source and a destination with a stream of data packets (called a "packet flow" or "flow") transferred through the network over a network path. The network path is defined by a set of nodes interconnected by a set of links through which packets of the connection are transferred. Packet networks may have a hierarchical structure in which smaller networks are interconnected by larger networks, and a peer structure in which equivalent networks are interconnected. A packet network connects to one or more other packet networks through ingress and egress points (routers) of the network.

Interior routing protocols are employed by network routers to determine a path through the nodes of the network along which packets between a source (ingress) and destination (egress) pair are forwarded. Packets received by a node's router are forwarded to other nodes based on a forwarding table constructed in accordance with the interior routing protocol, but may also be through routes installed with explicit route provisioning. Interior routing protocols may also specify network topology, link capacity/usage, and link-state information ("network information") that is exchanged between the network nodes. Network information allows the node's router to construct the corresponding forwarding table. An example of a widely used interior routing protocol for "best-effort" routing is the Open Shortest Path First (OSPF) protocol. In addition, some routing protocols associate a link "cost" with each link between nodes. This link cost may be associated with, for example, average link utilization or revenue generated by the link, as well as link "importance" in the network (i.e., how critical the link is to packet routing). When link-state information or link-bandwidth information (e.g., connectivity or available bandwidth) is exchanged between routers, each router in the network has a complete description of the network's topology.

Routing protocols, in addition to providing connectivity, may also enable traffic management. The Multi-Protocol Label Switched (MPLS) standard, for example, allows such routing protocols for traffic management. The MPLS standard may be employed for networks having virtual circuits (packet flows) or label switched paths (LSPs) with provisioned service levels (also known as guaranteed quality-of-service (QoS) levels).

Provisioned service levels may be, for example, a guaranteed minimum bandwidth for the path of a packet flow through the network. This path having a guaranteed level of service between ingress and egress points may be referred to as a Network Tunnel Path (NTP). As would be apparent to one skilled in the art, specific implementations of NTPs exist for different types of networks. As examples of NTPs, virtual circuits may be established for packet flows in TCP/IP networks, virtual circuits may be established for cells in Asynchronous Transfer Mode (ATM) networks, and label switched paths (LSPs) may be established for packets in MPLS networks. Packets of a signaling protocol, such as RSVP (Reservation Protocol for IP and MPLS networks) with traffic engineering extensions or CR-LDP (Constrained Routing Label Distribution Protocol for MPLS networks), may be used to reserve link bandwidth and establish an NTP. NTPs may be provisioned as explicit routes along specific paths between nodes of the network (i.e., when an NTP is provisioned, all intermediate points may be specified through which a packet passes between the ingress and egress points of the NTP).

In MPLS networks, packets are encapsulated by appending to the packet, or forming from the packet, additional information when the packet is received at an ingress point. The additional information, sometimes referred to as a label, is then employed by routers of the network to forward the corresponding packet. In some cases, the label may simply be a pointer that identifies or is otherwise related to specific origination and termination address fields in the header of the received packet.

Of increasing importance to network designers is to design networks with NTPs having guaranteed levels of service that incorporate restoration mechanisms, such as MPLS restoration for LSPs. These restoration mechanisms allow for provisioning of, and/or capacity reservation for, backup paths through the network onto which traffic of affected NTPs may be redirected relatively quickly upon detection of an element/link failure within the network. Often, the restoration path is provisioned concurrently when the original NTP of a request arriving at the network is provisioned.

Prior art methods to provide backup for network element/link failures usually determine two link-disjoint paths between the source and the destination of the demands, and then use one for the primary and one for the secondary. This prior art method is sometimes referred to as end-to-end restoration In end-to-end restoration, the secondary (backup) path is link (and/or node) disjoint from the primary (active) path. Link disjoint means that the primary and secondary paths do not have any links in common. Node disjoint means that the primary and secondary paths do not have any nodes in common, with the exception of the source and destination nodes.

FIG. 1 shows a network 100 having primary path 101 and secondary path 102 for a connection having end-to-end restoration between source node s (node 111) and destination node t (node 115). Primary path 101 (shown with solid link arrows) passes from node 111 through nodes 112, 113, and 114 to the destination node 115. Secondary path 102 (shown with dashed link arrows) passes from node 111 through nodes 116, 117, and 118 to the destination node 115. FIG. 2 shows the network 100 of FIG. 1 in which a failure between nodes 113 and 114 occurs. FIG. 2 shows the direction of information transfer from node 113 through node 112 to the source s (node 111) to detect the failure for the paths illustrated in FIG. 1. The information transferred is simply that the link has failed. The information is transferred back to the source, which then switches to the backup secondary path 102.

However, this approach in end-to-end restoration may have an unnecessarily long delay before switching from the primary to secondary path. This delay may occur because information has to propagate back to the source, which in turn switches from the primary to the secondary path for all the demands that use the link.

SUMMARY OF THE INVENTION

In accordance with embodiments of the present invention, a packet network of interconnected nodes employs dynamic backup routing of a Network Tunnel Path (NTP) request. Dynamic backup routing allocates an active and backup path to the NTP. Dynamic backup routing employs a local restoration model to determine the allocation of, and, in operation, to switch between, a primary (also termed active) path and a secondary (also termed backup) path based upon detection of a network failure. Switching from the active path is based on a backup path determined with iterative shortest-path computations with link weights assigned based on the cost of using a link to backup a given link in the active path. Costs may be assigned based on single-link failure or single element (node or link) failure. Link weights are derived by assigning usage costs to links for inclusion in a backup path, and minimizing the costs with respect to a predefined criterion. For single-link failure, each link in the active path has a corresponding disjoint link in the backup path. For single-element failure, in addition to backup of the final link in the active path, all links incident have disjoint bypass links assigned to account for node failure. While intra-demand sharing is used, inter-demand sharing may also be provided if complete network information is available for dynamic backup routing.

In accordance with an exemplary embodiment of the present invention, data may be routed through a network having a plurality of nodes interconnected by a plurality of links represented by a graph. A path request is received for routing the data between a source node and a destination node in the network based on a demand. The links in the graph are reversed to generate paths from the destination node to nodes along reverse paths to the source node. Shortest-path computations are performed for portions of the reverse paths to generate weights for potential active-path links, wherein each weight of a link in a reverse path is based on a number of reverse paths in which the link is included. The shortest-path computations are repeated for the graph from the destination to the source using the weighted links to generate an active path satisfying the path request, wherein each link in the active path has a defined back-up path.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with embodiments of the present invention, dynamic backup routing of a Network Tunnel Path (NTP) allocates an active and backup path to the NTP based upon detection of a network failure. Dynamic backup routing employs local restoration to determine the allocation, and, in operation, to switch between a primary (also termed active) path and a secondary (also termed backup) path. In local restoration, nodes on either end of one or more failed links switch traffic to a backup path. Switching from the active path is based on a backup path determined with iterative shortest-path computations with link weighting based on the cost of using a link to backup a given link for either single-link failure or single element (node or link) failure. Active and Back-up paths generated in accordance with embodiments of the present invention may provide for local restoration with relatively short delay in switching to a backup path.

In local restoration, when an element (a node or link) supporting a network tunnel path (NTP) fails, the nodes coupled to the element detect the failure and immediately switch all the connections (previously routed NTP demands) passing through the failed node or link to corresponding alternate paths. An NTP may fail if either a link in the path fails or a node in the path fails. If a link fails, then each provisioned connection passing through the link is routed to its backup link. However, if a node fails, dynamic backup routing of each provisioned connection passing through the node accounts for loss of all outgoing links from the element when routing an NTP to a restoration path.

As defined herein, a "demand" refers to an amount of service level capacity, such as bandwidth, necessary for a provisioned NTP request. Also, the terms "predecessor" and "upstream" node or link refer to nodes or links that are toward the NTP source in a path, while the terms "successor" and "downstream" node or link refers to nodes or links that are toward the NTP destination in a path. Dynamic backup routing in accordance with embodiments of the present invention may account for single-link failure only, or may account for single-element failure in which either a single node or a single link fails.

Thus, in accordance with embodiments of the present invention, the active path is determined based upon a criterion that the amount of bandwidth consumed by the active and backup path is at a relative minimum. The graph is modified such that shortest-path computations yield active and backup paths satisfying the criterion. The backup path, once the active path is provisioned, is thus disjoint from the path including the point of failure, either i) link or ii) node or link failure, based upon local restoration routing. A backup path is not provided if the source or the destination of the traffic fails.

Figure 1:
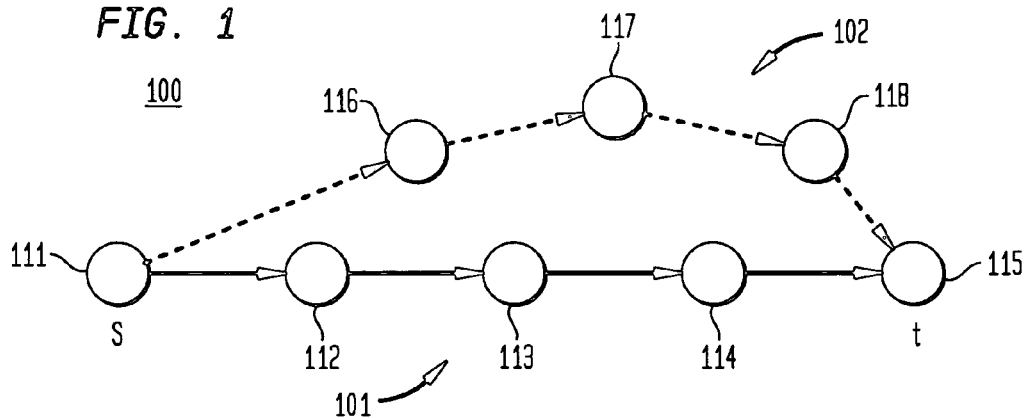
FIG. 1 shows a network having primary and secondary paths for a connection having end-to-end restoration of the prior art between source and destination nodes.
Figure 2:
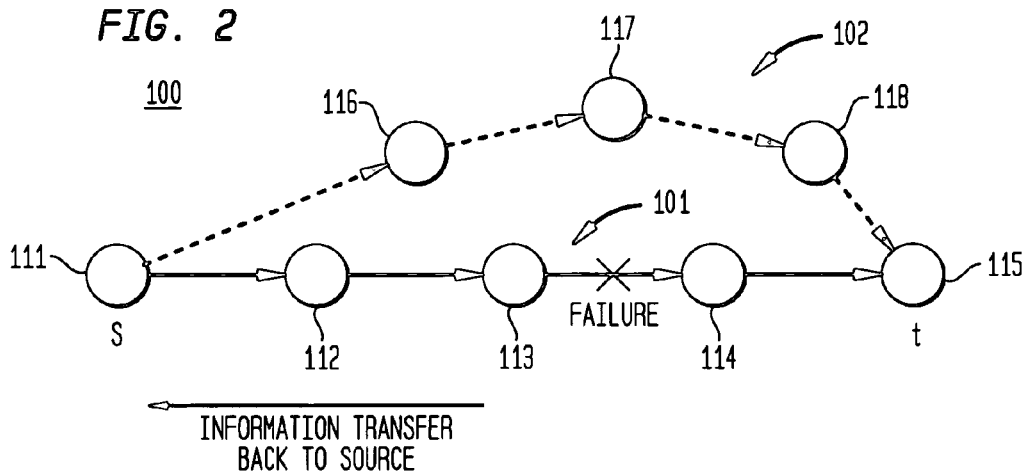
FIG. 2 shows a failure and direction of information transfer upon a failure for the paths of the network illustrated in FIG. 1.
Figure 3:
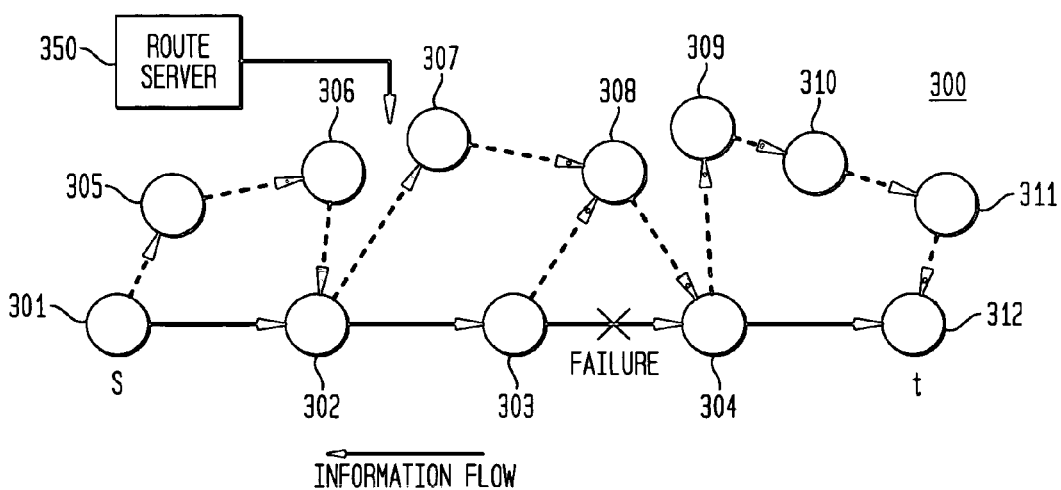
FIG. 3 shows a network having a set of nodes interconnected by a set of links and employing dynamic backup routing in accordance with embodiments of the present invention.

FIG. 3 shows a packet network portion 300 having a set V of nodes 301 through 312 interconnected by a set E of links $l(i,j)$, $301 \leq i,j \leq 312$ and $i \neq j$. Network 300 may optionally include route server 350 that receives an NTP request, and provisions active and backup paths in accordance with an exemplary embodiment of the present invention. Alternatively, dynamic backup routing may be implemented in a distributed fashion by a processor of one or more of nodes 301 through 312. Nodes 301 through 312 employ dynamic backup routing in accordance with one or more exemplary embodiments of the present invention. Node 301 is the source node s and node 312 is the destination node t for an NTP request having demand d.

When dynamic backup routing is employed to backup for single-link failure, each link in the active path has its own corresponding backup link(s) as part of a backup path. For the single-link failure case, the backup path for a link l(i, j) may be any path around nodes i and j that does not include link l(ij). The nodes that are at the end points of the failed link detect that the link has failed and they immediately switch all the demands that go on this link to the alternate path. Note that while the figures show links having one direction, not shown in the links are corresponding links in the opposite direction and links that may separately connect the nodes. Information regarding failures (link or node) flow upstream through one or more of these paths. This backup path for link (i, j) may employ any link within the network including: i) any links on the active path for the current demand (apart from link l(i, j)) and ii) any links that are used in the backup path for other active links. FIG. 3 shows a single-link failure of link l(303, 304), and the information transfer, since local restoration is employed, travels to only node 303, which initiates a transfer to a backup path over links l(303, 308) and l(308, 304) through node 308. For the network of FIG. 3 that shows a single-link failure (i.e., failure of link l(303,304), for example, the active and backup paths may be defined as given in Table 1:

TABLE 1

| Primary Path Links | Backup Path |
|---|---|
| source (301) to 302 | 301 to 305 to 306 to 302 |
| 302 to 303 | 302 to 307 to 308 to 304 |
| 303 to 304 | 303 to 308 to 304 |
| 304 to destination (312) | 304 to 309 to 310 to 311 to 312 |

For a single-element failure, either a link or a node may fail. For a node failure, all the links on this node fail and dynamic backup routing desirably designs the backup path to protect against the node's link failures by determining a backup path for every incident link of the node and the last link in the active path to the destination node. Single-element failures may be detected by nodes that are at endpoints of links outgoing from the failed node.

Figure 4:
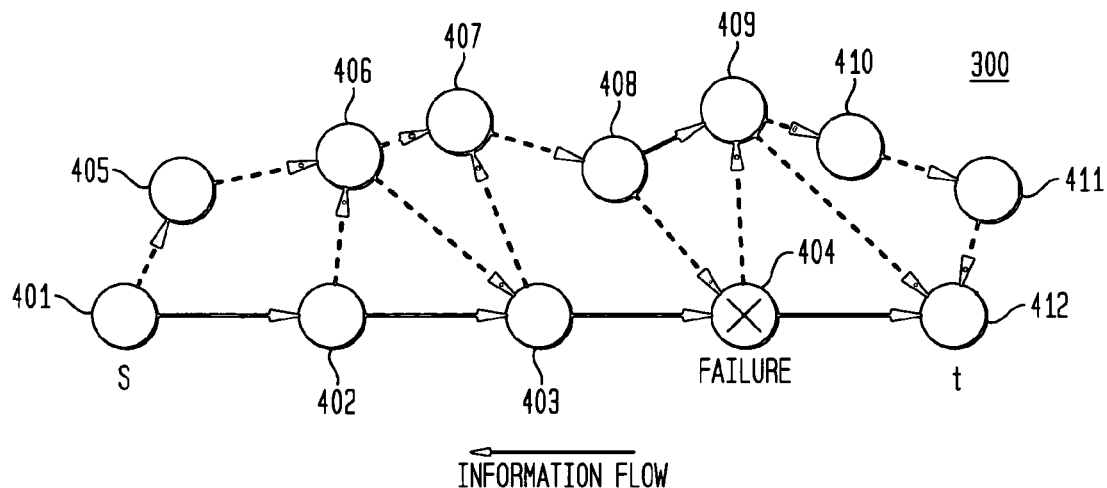
FIG. 4 illustrates detection of link failure for a node immediately upstream from a destination node initiating transfer of traffic to a corresponding backup link.

For single-element failures, the backup path for the failure of node k includes several steps. First, determine the incoming and outgoing links l(j,k) and l(k,m) in the active path passing through node k. If node k fails, all links incident on node k fail, and in particular, link l(i,k). Therefore the failure will be detected at node j and if there is an alternate path from node j to node m (or some other node between m and the destination t) then node j can divert traffic along this backup path. The backup path for the failure of node k avoids all links incident on node k. Generating bypass links for the single-node failure also provides backup paths for link failures, with the exception of the last link on the active path that reaches the destination. The exception is shown for the path illustrated in FIG. 4. Therefore, in contrast to the embodiments for dynamic backup routing accounting for single-link failure only, dynamic backup routing accounting for the single-element failure provides a backup path for all possible single-node failures and the failure of the last link in the active path reaching the destination node. For the network of FIG. 4 that shows a single-element failure (i.e., node 404), for example, the active and backup paths may be defined as given in Table 2:

TABLE 2

| Primary Path | Backup Path |
|---|---|
| Node 401 to 402 to 403 | 401 to 405 to 406 to 403 |
| Node 402 to 403 to 404 | 402 to 406 to 407 to 408 to 404 |
| Node 403 to 404 to 412 | 403 to 407 to 408 to 409 to 412 |
| Link l(404, 412) | 404 to 409 to 410 to 411 to 412 |

While capacity on the active path is not necessarily shared, capacity of the backup path may be shared in two ways: inter-demand sharing and intra-demand sharing. Inter-demand sharing refers to sharing of the backup bandwidths belonging to different demands. For example, if two equal demands between a given source and destination do not share any links in common on the active path, then the backup path for these two demands may be shared entirely. Intra-demand sharing refers to sharing of capacity between backup links on the backup path for a demand when the links in the active path have backup links/paths with some links in common. However, even if the two demands on the primary path share some links in common, it may still be possible for dynamic backup routing to share capacity between backup path links on the backup path with inter-demand sharing.

Referring to FIG. 3, link l(8, 4) is common to the backup paths that backup links l(2, 3) and l(3, 4). Thus, backup capacity of link l(8, 4) is shared on this link for backup links belonging to the same demand and is an example of intra-demand sharing. When computing backup paths, the amount of sharing employed by a given implementation depends on the amount of network information (e.g., link-usage information) that is available to the dynamic backup routing algorithm.

Dynamic backup routing in accordance with embodiments of the present invention may have either complete, partial, or minimal network information available. Complete network information includes information of all provisioned NTP demands through the network, information about the network topology, residual capacities of the links of the network, and routes for currently provisioned active and backup paths for connections currently traversing the network. In general, if a centralized network route server (such as route server 350 of FIG. 3) is employed, this complete information may be available. However, routing of NTP requests may be done in a decentralized manner, as may be the case when several different providers are interconnected within the packet network. Such networks may still employ a form of link-state flooding mechanism. Such link-state flooding mechanism allows all nodes in the network to have partial network information available to its routing algorithm. Partial information includes the total amount of bandwidth on a link used by primary paths, the total amount of bandwidth that is used by secondary paths, and the residual capacity of each link. When minimal network information is available, the dynamic backup routing algorithm has only information regarding the residual capacities of the network links.

Thus, a given implementation of dynamic backup routing of NTPs for restoration may account for 1) restoration in response to a single-link failure for complete, partial, or minimal network information; and 2) restoration in response to a single element (node or link) failure for complete, partial, or minimal network information. For ease in understanding the present invention, the following describes an exemplary dynamic backup routing algorithm for the single-link failure case, first for complete information and then with modifications to account for partial information. With the algorithm of dynamic backup routing described for the single-link failure, then the modifications to account for single-element failure are described.

A network (such as network 300 of FIG. 3) may be described by a directed graph GR (V, E) that represents the packet network. Graph GR (V,E) comprises the set V of nodes with a corresponding set E of links that interconnect the nodes. The node s $\in$ V represents the source node and t $\in$ V represents the destination node (where "$\in$" is the mathematical term for "element of"). Each link l(i, j) E E denotes a link that is a directed edge (arc) in the graph, and d represent the current demand size that is to be routed over a path through the available backup bandwidth (the "backup path"). Dynamic backup routing generates an active path in graph GR (V,E) for an NTP request defined by the triple (s, t, d), and generates the backup links of the backup path during the process of generating the active path. In the triple (s, t, d), d is the demand of b units of, for example, minimum bandwidth that must be supported in the backup path. As known in the art, service level (e.g., QoS) guarantees may, in general, be converted to an effective bandwidth.

NTP requests arrive one-by-one. NTP requests are desirably routed by an on-line implementation of the dynamic backup routing algorithm that routes both the active path and the backup path for each link or node while meeting the service provider traffic engineering requirements. Each NTP request to set-up a connection with a given demand arrives one at a time. Each request has an ingress node, an egress node and an associated bandwidth. For wavelength switched paths, the bandwidth is just the wavelength capacity or unit bandwidth if all wavelengths have identical capacity. If sufficient bandwidth is not available to set up either the active path or the backup path then the connection set-up request is rejected.

Dynamic backup routing employs repeated invocations of a shortest path routing algorithm, such as Dijkstra's algorithm, to generate links for the backup path. To generate a forwarding table, each router of a node computes a set of preferred paths through the network nodes, and may use link weighting to calculate the set of preferred paths. Link weighting is implemented by assigning usage costs to backup links based on a predefined cost criterion. Each preferred path has a minimum total weight between nodes as well as a minimum summed weight through nodes of the path, which is known in the art as shortest-path routing. This set of preferred paths may be defined with a shortest-path tree (SPT) in a directed graph. The SPT may be calculated using an algorithm such as Dijkstra's algorithm, described in E. Dijkstra, "A Note: Two Problems In Connection With Graphs," Numerical Mathematics, vol.1, 1959, pp. 269–271.

Figure 5:
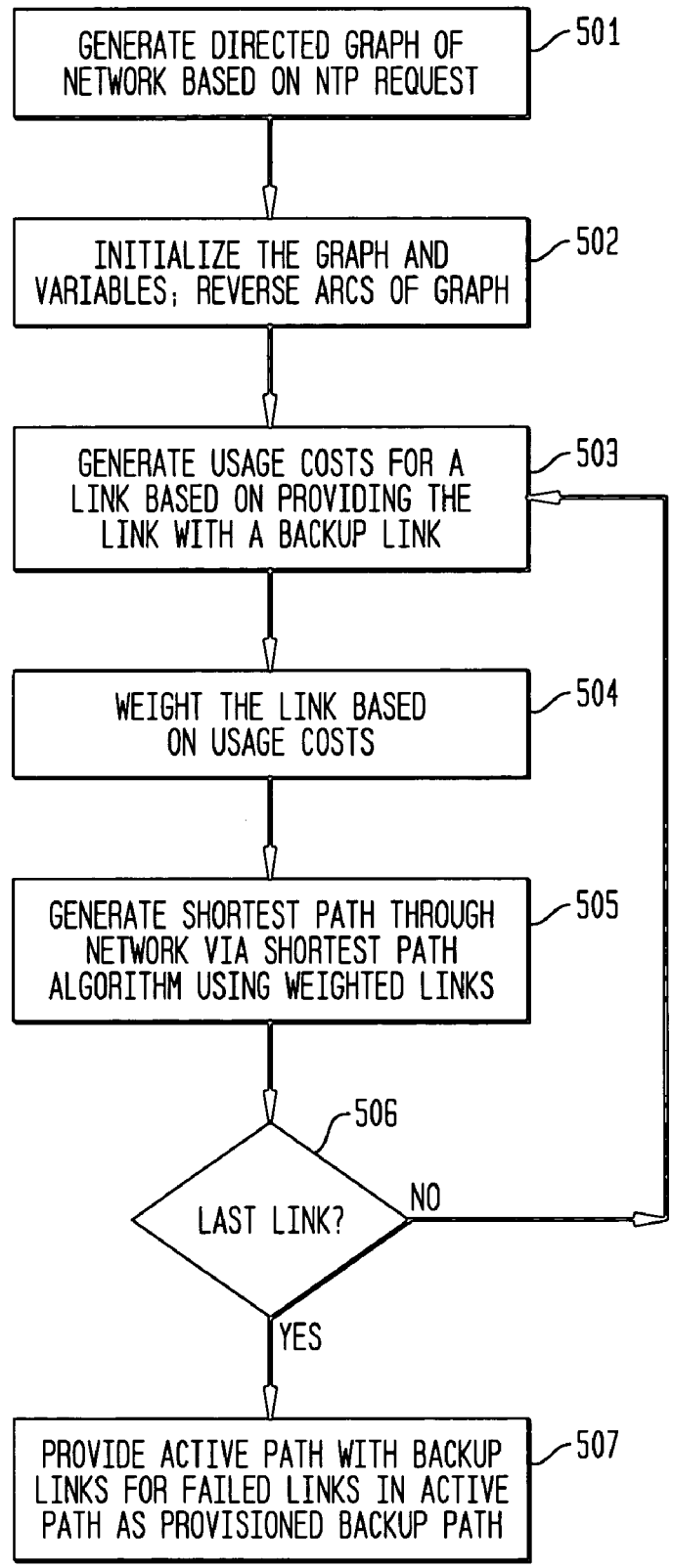
FIG. 5 shows an exemplary algorithm for dynamic backup routing in accordance with the first exemplary embodiment of the present invention.

FIG. 5 shows an exemplary algorithm for dynamic backup routing in accordance with an embodiment of the present invention. At step 501, the algorithm generates the graph GR (V,E) of the network, possibly accounting for the demand of the NTP request defined by the triple (s, t, d). Accounting for the demand of the NTP request may be to delete those links in the graph having insufficient capacity to route the demand in an active and/or backup path. Step 501 may simply update the graph, if necessary, if the graph was generated previously.

At step 502, the algorithm initializes variables and the graph by reversing the direction of all arcs in the network. After initialization, the graph may only include those links and nodes that are present in the network that can support the demand in either an active or backup path. As used herein, "arc" or "edge" refers, mathematically, to the link of a directed graph. The initialization of the graph in step 502 employs complete, partial, or minimal information that is available, and reverses the direction of the links for shortest-path computation from the destination, as described subsequently.

After step 502, an iterative process begins to step through the links of the graph GR (V,E) to choose links for the active path and to weight the links, with each link weight based on a cost of providing the link in a backup path. The computed usage cost of a link depends on whether complete, partial, or minimal information is available to allow inter-demand and possibly intra-demand sharing of backup links, as described subsequently, between the backup path of the current NTP request (s, t, d) and backup paths of other NTP requests.

At step 503, the cost of providing a given link with a local backup is computed for the link by summing the usage cost of links for each partial backup path that routes the demand. Each usage cost is generated as the cost of using one or more given links disjoint from the active path link to backup the link in the active path. The usage costs are computed with multiple invocations of a shortest-path computation for each partial backup path including the link because the backup path for a link can terminate at any point (node) on the path from that link to the destination. For example, the termination point on the path may be the upstream node from a detected single-link failure. Since the amount of intra-demand saving is a function of the node where the backup path ends, the shortest path algorithm is executed from each node in the path from the current link to the destination. At step 504, using the usage costs of the link, the link is weighted. Generating usage costs may also generate reserved link bandwidth along the backup path.

At step 505, the shortest path through the network is generated using the link weights, which provides the current links in the active path as well as specified reserved bandwidth on links in GR(V,E) for the backup path.

At step 506, a test determines if the cost of the last link has been calculated, which is equivalent to reaching the source node from the destination node. If the test of step 506 determines that the current link is not the last link, the process returns to step 503 to calculate a weight for the next link. If the test of step 506 determines that all links weights have been calculated, the process moves to step 507. At step 507, the active path is provided to route the demand of the NTP request, and the backup links corresponding to the links of the active path are provided as the backup path. With such backup links provided, provisioning may subsequently reserve bandwidth in the backup path for the NTP request connection.

The relationship between costs assigned to links of step 503 and whether complete, partial, or minimal information is available, is now described.

When complete information is available, dynamic backup routing may permit best sharing of backup capacity, but may be computationally impractical or unrealistic in terms of stored network information. Dynamic backup routing using partial information allows for both intra-demand and inter-demand sharing of backup capacity, while using a relatively small amount of stored information regarding network provisioning. For dynamic backup routing with minimal network information, inter-demand sharing may not necessarily be accounted for since relevant information of backup bandwidth usage is not available, but may still provide reasonable performance of routing backup paths.

To determine the amount of sharing the following definitions are used herein. The set $A_{ij}$ represents the set of demands that use link l(i, j) for each demand's active path and the set $B_{ij}$ represents the set of demands that use link l(i, j) for each demand's backup path. The $k^{th}$ element $b_k$ of either the set $A_{ij}$ or set $B_{ij}$ is a bandwidth reservation of the $k^{th}$ existing provisioned NTP connection. The variable $F_{ij}$ represents the total amount of bandwidth reserved for the demands in the set $A_{ij}$ that use the link l(i, j) on the active path, and the relation for the variable $F_{ij}$ is given in equation (1):

$$F_{ij} = \sum_{k \in A_{ij}} b_k \qquad (1)$$

The variable $G_{ij}$ represents the total amount of bandwidth reserved for backup path demands (in the set $B_{ij}$) whose backup paths use link l(i, j). The relation for the variable $G_{ij}$ is given in equation (2):

$$G_{ij} = \sum_{k \in B_{ij}} b_k \qquad (2)$$

The variable $R_{ij}$ represents the residual bandwidth of link l(ij) and is equivalent to $(C_{ij} - F_{ij} - G_{ij})$, where $C_{ij}$ is the total capacity of the links. $R_{ij}$ represents the minimal network information for an implementation of a dynamic backup routing algorithm. When complete information is available, each node knows the sets $A_{ij}$ and $B_{ij}$ for each link l(ij) in the network. For partial information, each node has only the values of $F_{ij}$, $G_{ij}$ and $R_{ij}$ available for each link l(ij) in the network.

Without knowledge of future demands for routing of active and backup paths, dynamic backup routing determines the active and backup path for the current NTP request that "optimizes" the use of network infrastructure based upon a specified criterion. One criterion is to minimize the sum of the bandwidths that is used by the active and the backup paths. When no restoration, and thus no backup path, is provisioned, this criterion leads to min-hop routing.

First, weighting with link usage costs for dynamic backup routing for a single-link failure with i) partial and ii) complete information is described. If link l(i, j) is used in the active path, a backup path exists bypassing link l(ij) so as to backup any failure of this link. This backup path starts at (or upstream from) the node i, but may terminate at any downstream node between node j and the destination t on the active path. For simplicity, the backup path for link l(i, j) starts at node i and terminates at node j. The overall bandwidth when link l(i, j) is used in the active path is the sum of the bandwidth for using it in the active path and the bandwidth used for backing up the link. The bandwidth required if link l(i, j) is used on the active path is defined as the demand d=b units. The bandwidth required to backup link l(i, j) may be then be used to determine the shortest path from node i to node j after removing link l(i, j).

The usage costs for weighting each link depends on the network information model used. For complete information, the sets $A_{ij}$ and $B_{ij}$ are known for each link l(i, j). Backup paths may be shared between those demands (existing provisioned NTPs) whose active paths do not share common links. The quantity $\theta_{ij}^{uv}$ is defined for each link pair l(i, j) and l(u, v). This quantity $\theta_{ij}^{uv}$ is the usage cost of using link l(u, v) on the backup path if link l(i, j) is used in the active path. To compute the value of $\theta_{ij}^{uv}$, the set $\phi_{ij}^{uv} = A_{ij} \cap B_{uv}$ (where "$\cap$" is the mathematical intersection of sets) is defined as the set of demands that use link l(i, j) on the active path and link l(u, v) on the backup path. The sum of all the demands may be represented by the variable $\delta_{ij}^{uv}$ as defined in equation (3):

$$\delta_{ij}^{uv} = \Sigma_{k \in \phi_{ij}^{uv}} b_k \qquad (3)$$

If the current demand is for b units of bandwidth between nodes s and t, then $\theta_{ij}^{uv}$ is defined as in equation (4):

$$\theta_{ij}^{uv} = \begin{cases} 0 & \text{if } \delta_{ij}^{uv} + b \leq G_{uv} \\ & \text{and } (i, j) \neq (u, v) \\ \delta_{ij}^{uv} + b - G_{uv} & \text{if } \delta_{ij} + b > G_{uv} \text{ and} \\ & R_{uv} \geq \delta_{ij} + b - G_{uv} \\ & \text{and } (i, j) \neq (u, v) \\ \infty & \text{Otherwise} \end{cases} \qquad (4)$$

If only partial information is available, then the relation of equation (5) holds:

$$\delta_{ij}^{uv} \leq F_{ij} \forall (i,j) \; \forall (u,v). \qquad (5)$$

Given the relationship of equation (5), then the cost $\theta_{ij}^{uv}$ of a link l(u, v) with partial information is given as in equation (6):

$$\theta_{ij}^{uv} = \begin{cases} 0 & \text{if } F_{ij} + b \leq G_{uv} \text{ and} \\ & (i, j) \neq (u, v) \\ F_{ij} + b - G_{uv} & \text{if } F_{ij}^{uv} + b > G_{uv} \text{ and } R_{uv} \geq \\ & F_{ij}^{uv} + b - G_{uv} \text{ and } (i, j) \neq (u, v) \\ \infty & \text{Otherwise} \end{cases} \qquad (6)$$

For the partial information scenario, since the precise value for $\delta_{ij}^{uv}$ is not available to the routing algorithm, the value for $F_{ij}$ is employed as an approximation for the value of $\delta_{ij}^{uv}$.

Since links l(ij) and l(u,v) are not both in the active and the backup paths, the value of $\theta_{ij}^{uv}$ is set to infinity if l(i, j)=l(u, v). This ensures that the active and backup paths will be disjoint. The quantity $\theta_{ij}^{uv}$ represents the amount of backup capacity (i.e., available capacity reserved for backup paths) on link l(u, v) that is already reserved for backup paths of previously routed demands that use link l(i, j), and, hence, the amount that cannot be used to backup the current demand if it, too, were to use link l(i, j) in the active path. If $\delta_{ij}^{uv} + b \leq G_{uv}$ then the current demands may be backed up on link l(u, v) without reserving any additional bandwidth.

The cost of using link l(i, j) may then be calculated as the sum of the cost of using link l(i, j) on the active path and the cost of its bypass path. To determine the cost of bypassing link l(i, j), the shortest path from node i to node j is computed via a shortest-path routing algorithm (excluding link l(i, j)) where the cost of each link l(u, v) in the path is given by $\theta_{ij}^{uv}$. The length (also termed distance) of this shortest path between node i and node j is defined as $\phi_{ij}$. The "usage" cost of using a link l(i, j) on the active path is the sum of the bandwidth usage on the link l(i, j) and bandwidth usage for the bypass of the link l(i, j) (i.e., b+$\phi_{ij}$). Once usage costs are associated with each link in the network (using a total of m shortest-path computations), the shortest path is calculated between source node s and destination node t using b+$\phi_{ij}$ as the cost of link l(i, j). Thus, the cost of a backup path may be determined by a series of shortest path problem computations: one computation for each link in the network (for up to m links), and one for the network once the usage costs are assigned to the links. Therefore m+1 shortest path problem calculations are performed. This cost of a backup path gives the minimum amount of bandwidth without intra-demand sharing taken into account To account for the backup path for link l(i, j) starting at node i but ending at any node on the path from j to t (including j and t), the above-described method of link usage cost and backup path cost calculation is modified as follows. The shortest path (e.g., Dijkstra's) algorithm is executed backwards starting at the destination node (termed the "sink" of the graph) for each node between destination node t and node j. Thus, preferred embodiments of dynamic backup routing reverse the direction of the network links and each of the series of shortest-path computations is executed by finding the shortest path backwards from the destination node t to the source node s.

Figure 6:
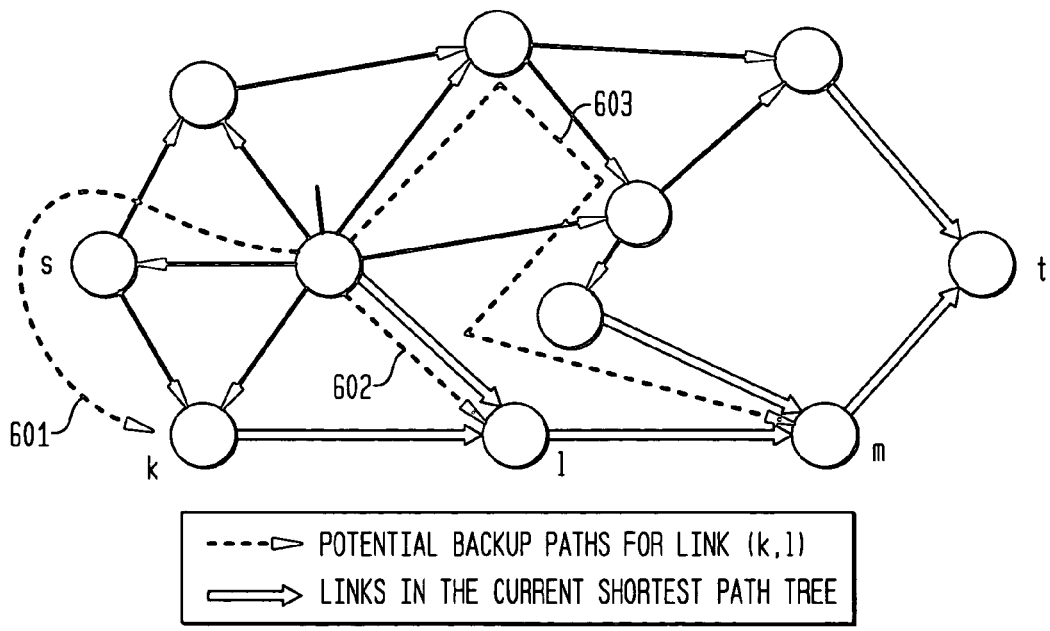
FIG. 6 shows a network illustrating the shortest-path computations backward from the destination for one step in the exemplary algorithm of FIG. 5.

FIG. 6 shows a network illustrating the shortest-path computations backward from the destination node t for one step in the algorithm. The dark lines in the graph represent the shortest path tree when Dijkstra's algorithm is executed backwards from destination node t. For every node that is permanently labeled in (i.e., a confirmed element of) the shortest path tree there is a unique path from that node to the sink. For example, as shown in FIG. 6, node k is permanently labeled when we are constructing the shortest path tree from the sink ("sink" being the graph term for the end node, in this case the destination node t) to the node k.

Associated with node k is the path P(k) defined by links l(k,l), l(l,m), and l(m,t) (i.e., in graph notation P(k)={l,m,t}) along the shortest path tree from node k to the destination node t. For link l(k, j) in the network, the cost of using link l(k, j) in the active path is the sum of bandwidth currently being routed over link l(k,j) and the cost of backing up link l(k, j). The dotted lines in FIG. 6 illustrate three different paths 601, 602, and 603 to backup link (k, j) that may be employed for a portion of the active path to the destination node 1. The shortest path from k to any node in P(k) is computed by running Dijkstra's algorithm from j using $\theta_{kj}^{uv}$ on link (u,v), and terminating the algorithm when the node in the set P(k) is permanently labeled by the algorithm.

Dynamic backup routing for a single-link failure and accounting for intra-demand sharing of backup bandwidth is now described. To account for intra-demand sharing, the dynamic backup routing algorithm maintains a vector at each node that tracks reserved bandwidth that is used by other, previously routed demands. Specifically, the vector provides for tracking the amount of bandwidth reserved for the current demand that may be used for backing up all links from the given node to the destination. Intra-demand sharing of bandwidth occurs when the link l(i,j) uses link l(u,v) for a backup and reserves a bandwidth of w units on link l(u, v). When some other link l(k,l) on the active path wants to use link l(u, v) for its backup path, then, in addition to any inter-demand sharing, this other link may use the already reserved bandwidth of w units on link l(u, v) for "free" (no added usage cost to the link).

To keep track of the amount of reserved bandwidth at each link, the vector $\lambda^u$ is defined for each node u. The vector $\lambda^u$ has a length m equivalent to the number m of links in the graph of the network. The value of element $\lambda_{ij}^u$ for link l(ij) in vector $\lambda^u$ represents the amount of bandwidth reserved by the current demand for all the backup paths for all the links leading from node u to the destination t. This bandwidth reservation for the current demand can be used to save bandwidth by intra-demand sharing, when backing up the links from u to the source s that are yet to be determined by the implementation of the dynamic backup routing algorithm.

For example, for the network of FIG. 6, when the backup path for link l(k, j) is being determined, the shortest path is determined in the backward direction from node j to node k. The m-length vector $\lambda^j$ represents the reservation made for this demand for all of the backup paths from node j to the sink. This path is known since there is at least one unique path from node j to the sink in the shortest path tree. For a given link l(m,n) in the network, the variable $k_{mn}$ is defined as given in equation (7):

$$k_{mn} = F_{kj} + b - B_{mn} - \lambda'_{mn}. \qquad (7)$$

where d=b is the bandwidth of the current demand. Then the incremental usage cost $l_{mn}$ of link l(m, n) when determining the shortest backup path (similar to equation (4)) is given in equation (8):

$$l_{mn} = \begin{cases} 0 & \text{if } k_{mn} \leq 0 \\ \delta_{mn} & \text{if } 0 \leq k_{mn} \leq b \text{ and } R_{mn} \geq k_{mn} \text{ and} \\ & (m, n) \neq (k, j) \\ \infty & _{mn}\text{Otherwise} \end{cases} \qquad (8)$$

Maintaining the vector at each node and modifying the incremental usage cost as given in equation (8) allows for a method for accounting for the intra-demand sharing within the dynamic backup routing algorithm.

The previously described techniques for dynamic backup routing with single-link failure may be modified to account for single-element failure by generating node bypass paths. Two distinct modifications are made. One modification avoids those links that are incident on the failed node, and the other modification accounts for all the links incident on the node failing simultaneously. First, when the cost of including link l(i, j) in the active path is determined, the cost of a backup from node i to the successor of node j does not include using any of the links incident on node j. When the dynamic backup routing algorithm advances backwards from the sink, the successors of all the nodes permanently labeled by Dijkstra's algorithm are already known since a path has been established from that node to the destination.

Second, when a node fails, all links incident on the node fail, and the cost of the backup accounts for all the links incident on the node failing simultaneously. The dynamic backup routing algorithm accounts for routing of demands on those links that are outgoing links from the node to their backup paths. For example, when computing the cost of using link l(i, j) in the active path, the cost of backing up demands that use link l(j,l) for l $\in$V is accounted for. These two modifications to equations (4) and (6) provide the usage cost expressions of using link l(u, v) as given in equation (9) for complete information and equation (10) for partial information:

$$\theta_{ij}^{uv} = \begin{cases} 0 & \text{if } \sum_{(j,k)\in E} \delta_{jk}^{uv} + b \leq \\ & G_{uv} \text{ and } (i,j) \neq (u,v) \\ \sum_{(j,k)\in E} \delta_{jk}^{uv} + b - G_{uv} & \text{if } \sum_{(j,k)\in E} \delta_{ij}^{uv} + b > G_{uv} \\ & R_{uv} \geq \sum_{(j,k)\in E} \delta_{jk}^{uv} + \\ & b - G_{uv} \text{ and} \\ & (i,j) \neq (u,v) \\ \infty & \text{Otherwise} \end{cases} \quad (9)$$

$$\theta_{ij}^{uv} = \begin{cases} 0 & \text{if } \sum_{(j,k)\in E} F_{jk} + b \leq G_{uv} \\ & \text{and } (i,j) \neq (u,v) \\ \sum_{(j,k)\in E} F_{jk} + b - G_{uv} & \text{if } \sum_{(j,k)\in E} F_{jk} + b > G_{uv} \\ & \text{and } R_{uv} \geq F_{ij} + b - G_{uv} \\ & \text{and } (i,j) \neq (u,v) \\ \infty & \text{Otherwise} \end{cases} \quad (10)$$

The algorithm for dynamic backup routing with a single-link failure using partial information is now illustrated with the pseudo-code below. One skilled in the art may readily modify the algorithm for other cases. Dynamic backup routing in accordance with the present invention may be implemented with three routines, described subsequently, and the following notation is used herein for the three routines. The variables T and T' each represent a set of temporarily labeled nodes of graph GR(V,E), and the variables P and P' each represent a set of permanently labeled nodes of graph GR(V,E). Node labels employed during each execution of Dijkstra's algorithm are represented by variables $\phi$ and $\gamma$. Vectors Q and Q' each represent a predecessor array of nodes along the shortest path tree for computations at a current node.

A given node u in graph GR(V,E) has an associated arc-length array $\lambda^u$, where $\lambda_{ij}^u$ of $\lambda^u$ represents that amount of bandwidth reserved on link l(i,j) for the current demand d on all links on the path from node u to the destination node t. Each invocation of Dijkstra's algorithm begins from the destination node t. Therefore, at any given point in the algorithm and for any permanently labeled node u, there is a unique path from u to the destination t and hence $\lambda^u$ is known for any permanently labeled node. An arc-length array $\beta$ is defined to temporarily store the value of $\gamma$ for node u (represented as $\gamma^u$).

In accordance with a first embodiment of the present invention, pseudo-code for dynamic backup routing with complete information for single-element failure is now described. In order to share the available backup path bandwidth in the network, every node knows how each demand in the network is routed. This situation may arise if routing is accomplished by a centralized route server. The main routine is LOCAL_EDGE_DISJOINT() which generates and initializes the network graph GR(V,E). The main routine iteratively steps through the links of the graph GR(V,E) to weight the links, with each link weight based on a cost of providing the backup path. The main routine during each iteration calls the subroutine ALT_PATH_COST() that determines the cost of providing the link with a local backup. The routine ALT_PATH_COST() computes the sum of the usage costs for each link by summing the number of links for each partial backup path that routes the demand. The sum is thus computed iteratively by invocation of the subroutine SHORT_PRED_PATH(). Once weighting of links by the main routine LOCAL_EDGE_DISJOINT() is accomplished, the main routine then determines the shortest path through the network for the active path based on the link weights. Both the routines LOCAL_EDGE_DISJOINT() and SHORT_PRED_PATH() as given below may be considered as modified versions of Dijkstra's algorithm.

```
                    LOCAL_EDGE_DISJOINT(s, t)

100    */INITIALIZATION/*
101    Reverse all arcs in the network.
102    T = V; P = φ; φₜ = 0; φⱼ = ∞ ∀j ≠ t
103    λₘₙᵈ = 0 ∀l(m, n) ∈ E, Q(t) = φ
104    */ITERATIVE STEP/*
105    k = Arg minⱼ∈T (φⱼ).
106        If k = s GO TO Step 117.
107    T = T\{k} and P = P ∪ {k}.
108    For each j ∈ T, l(k, j) ∈ E
109        wₖⱼ = ALT_PATH_COST (k, j)
110            if (φⱼ ≥ wₖⱼ + φₖ)
111                φⱼ = φₖ + wₖⱼ
112                Q(j) = k
113    Go to Step 105
114    */TERMINATION/*
117        Exit.
                    ALT_PATH_COST(k, j)

200    */INITIALIZATION/*
201        u = Q(k) and if u = φ then u = k. Set MIN = ∞.
202    */ITERATIVE STEP/*
203        If u = φ go to Step 210.
204        α = SHORT_PRED_PATH (k, u, j).
205        if (α ≤ MIN)
206            MIN = α
207            λₘₙʲ = βₘₙ ∀(m, n) ∈ E
208        u = Q(u) Go to Step 203.
209    */TERMINATION/*
210        Exit.
```

-continued

SHORT_PRED_PATH(k, u, j)

```
300    */INITIALIZATION/*
301    if k ≠ t then φ_kj^mn = A_kj ∩ B_mn and δ_mn = Σ_{w∈φkj}^mn d_w  ∀(mn) ∈ E.
302    If k = t then φ_kj^mn = A_kj ∩ B_mn and Σ_{I(k, J)∈h} Σ_{w∈φkl}^mn d_2  ∀(mn) ∈ E.
303    If k ≠ t, then
```

304
$$l_{mn} = \begin{cases} 0 & \text{if } \delta_{mn} \le 0 \\ \delta_{mn} & \text{if } 0 \le \delta_{mn} \le d, R_{mn} \ge \delta_{mn}, (m, n) \ne (k, l) \forall (k, l) \in E \\ \infty & \text{Otherwise} \end{cases}$$

305    If k = t then

306
$$l_{mn} = \begin{cases} 0 & \text{if } \delta_{mn} \le 0 \\ \delta_{mn} & \text{if } 0 \le \delta_{mn} \le d \text{ and } R_{mn} \ge \delta_{mn} \text{ and } (m, n) \ne (k, j) \\ \infty & \text{Otherwise} \end{cases}$$

```
307        T' = V, P' = φ, γ_u = 0, γ_j = ∞  ∀j ≠ u
308        λ_mn^d = 0  ∀(m, n) ∈ E
309    */ITERATIVE STEPS/*
310        w = Arg min_{i∈T}(w_j). If w = s go to Step 321.
311        T' = T'\{w} and P' = P'∪{w}.
312        For each i ∈ T', (s, i) ∈ E
313        if (γ_i ≥ l_{si} + γ_w)
314            γ_i = γ_w + l_{si}
315            Q'(i) = w
316        Go to Step 310.
317    */TERMINATION/*
318    Set β_mn = λ_mn^u  ∀(m, n) ∈ E
319    if arc (mn) is on the shortest path from u to j:
320        Set β_mn = λ_mn^u + l_mn
321    Exit.
```

Pseudo-code for single-element failure with partial information is now given for the second exemplary embodiment. While it would be advantageous for every node to know how each demand in the network is routed, such as if routing is done via a centralized route server, most networks have decentralized routing. However, if a link-state flooding mechanism exists in the network, dynamic backup routing may be implemented. The link-state flooding mechanism propagates information throughout the network including, for each link, the total amount of bandwidth on that link that is used by primary paths, the total amount of bandwidth that is used by secondary path and the residual capacity on that link. This partial information is used by the source node of the NTP request defined by the triple {s, t, d} to route the demand d=b units of bandwidth. The main routines are again named LOCAL_EDGE_DISJOINT(), ALT_PATH_COST( ), and SHORT_PRED_PATH() with cost calculations modified for partial information as given in equation (6).

LOCAL_EDGE_DISJOINT (s, T)

```
100        */INITIALIZATION/*
101        Reverse all arcs in the network GR(V,E).
102        T = V; P = φ; φ_1 = 0; φ_j = ∞  ∀j ≠ t;
103        λ_mn^d = 0  ∀(m,n) ∈ E; Q(t) = φ.
104        */ITERATIVE STEP/*
105        k = Arg min_{j∈T} φ_j.
106        If k = s go to Step 115.
107        T = T\{k} and P = P ∪ {k}.
108        For each j ∈ T, (k,j) ∈ E.
109            w_kj = ALT_PATH_COST(k, j)
110        if (φ_j ≥ w_kj + φ_k)
111            φ_j = φ_k + w_kj
112            Q(j) = k
113        Go to Step 105.
114    */TERMINATION/*
115        Exit.
```

ALT_PATH_COST(k, j)

```
200    */INITIALIZATION/*
201    u = Q(k) and, if u = φ, then u = k. Set MIN = ∞.
202    */ITERATIVE STEP/*
```

-continued

```
203   If u = φ, then go to Step 210.
204       α = SHORT_PRED_PATH (k, u, j).
205   If (α ≤ MIN)
206       MIN = α
207       λ_mn^j = β_mn ∀(m, n) ∈ E
208       u = Q(u) Go to Step 203.
209   */TERMINATION/*
210       Exit.
                    SHORT_PRED_PATH (k, u, j)

300   */INITIALIZATION/*
301   If k ≠ t, then δ_mn = F_kj + d − G_mn − λ_mn^u ∀(mn) ∈ E.; otherwise
302   If k = t then δ_mn = Σ_(k, l) ∈h F_kl + d − G_mn − λ_mn^u ∀(mn) ∈ E.
```

303   If k ≠ t then
$$l_{mn} = \begin{cases} 0 & \text{if } \delta_{mn} \leq 0 \\ \delta_{mn} & \text{if } 0 \leq \delta_{mn} \leq d, R_{mn} \geq \delta_{mn}, (m, n) \neq (k, l) \forall (k, l) \in E \\ \infty & \text{Otherwise} \end{cases}$$

304   If k = t then
$$l_{mn} = \begin{cases} 0 & \text{if } \delta_{mn} \leq 0 \\ \delta_{mn} & \text{if } 0 \leq \delta_{mn} \leq d \text{ and } R_{mn} \geq \delta_{mn} \text{ and } (m, n) \neq (k, j) \\ \infty & \text{Otherwise} \end{cases}$$

```
305   T' = V; P' = φ; γ_u = 0; γ_j = ∞ ∀j ≠ u;
306   λ_mn^d = 0, ∀(m, n) ∈ E
307   */ITERATIVE STEP/*
308   w = Arg min_{i∈T} w_j .
309   If w = s go to Step 319.
310   T' = T'\{w} and P' = P'∩{w}.
311   For each i ∈ T', (s, i) ∈ E
312       if (γ_i ≥ l_sl + γ_w)
313       γ_i = γ_w + l_sl
314       Q'(i) = w
315       Go to Step 308.
316   */TERMINATION/*
317   Set β_mn = λ_mn^u ∀(m, n) ∈ E
318   if arc (mn) is on the shortest path from u to j, set β_mn = λ_mn^u + l_mn.
319       Exit.
```

Pseudo-code for implementations of dynamic backup routing for single-element failure with no information may be derived from the methods described for partial information and using the cost calculations as described previously for this case. Similarly, pseudo-code for implementations of dynamic backup routing for single-link failure with complete, partial or minimal information may be derived from the methods described for complete information or partial information with single-element failure. Specifically, the algorithms are modified to remove only the failed link rather than the failed node and all incident links on the failed node in the directed graph GR(V,E). Thus, these scenarios may be considered as simplified cases of the described embodiments.

As would be apparent to one skilled in the art, the various functions of dynamic backup routing for local restoration may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing data through a network having a plurality of nodes interconnected by a plurality of links represented by a graph, the method comprising the steps of:
   (a) receiving a path request for routing the data between a source node and a destination node in the network based on a demand;
   (b) reversing the links in the graph to generate paths from the destination node to nodes along reverse paths to the source node;
   (c) performing shortest-path computations for portions of the reverse paths to generate weights for potential active-path links, wherein each weight of a link in a reverse path is based on a number of reverse paths in which the link is included; and (d) repeating the shortest-path computations of step (c) for the graph from the destination to the source using the weighted links to generate an active path satisfying the path request, wherein each link in the active path has a defined back-up path.

2. The invention of claim 1, further comprising the step of routing the data using the active path.

3. The invention of claim 2, further comprising the step of routing the data through one of the defined backup paths in response to a failure in the active path.

4. The invention of claim 1, wherein each node in the active path other than the source and destination nodes has a defined back-up path.

5. The invention as recited in claim 1, wherein step (c) includes the step of selecting each link to generate a backup path to back up for a failure of a single link.

6. The invention as recited in claim 1, wherein step (c) includes the step of selecting each link to generate a backup path to back up for a failure of a single element.

7. The invention as recited in claim 6, wherein step (c) includes the step of selecting each link to generate a backup path to back up for a failure of a each node in the active path and a failure of a last link in the active path.

8. The invention as recited in claim 7, wherein step (c) includes the step of selecting each link to generate a backup path to back up for a failure of a each node by generating a backup link for each link incident on the failed node.

9. The invention as recited in claim 1, wherein step (c) includes the step of generating usage costs for a link weight based on either complete, partial, or minimal network information.

10. The invention as recited in claim 9, wherein step (c) weights each link by generating a sum of usage costs for each back-up path link based on a number of back-up paths for which the back-up path link is employed to back-up an active path link.

11. The invention as recited in claim 9, wherein step (c) weights each link by generating a sum of usage costs for backup links based on a number of demands for which each back-up link is employed.

12. The invention as recited in claim 9, wherein, when step (c) generates the usage costs with intra-demand sharing of link capacity, step (c) further includes the step of accounting for intra-demand sharing with a vector for each node having the amount of demand for backup paths of previously routed demands, each usage cost being an incremental usage cost based on demand reserved for each backup path on a link accounted for with a corresponding element of the vector for the link.

13. The invention as recited in claim 9, wherein usage costs account for intra-demand sharing of link capacity.

14. The invention as recited in claim 9, wherein step (c) generates usage costs based on complete information for failure of a single link of the plurality of links, wherein the usage cost $\theta_{ij}^{uv}$ of link $l(i,j)$ with $l(u,v)$ is:

$$\theta_{ij}^{uv} = \begin{cases} 0 & \text{if } \delta_{ij}^{uv} + b \leq G_{uv} \\ & \text{and } (i,j) \neq (u,v) \\ \delta_{ij}^{uv} + b - G_{uv} & \text{if } \delta_{ij}^{uv} + b > G_{uv} \text{ and} \\ & R_{uv} \geq \delta_{ij}^{uv} + b - G_{uv} \\ & \text{and } (i,j) \neq (u,v) \\ \infty & \text{Otherwise} \end{cases}$$

where $A_{ij}$ represents the set of demands that use link $l(i,j)$ for each demand's active path and the set $B_{UV}$ represents the set of demands that use link $l(U,V)$ for each demand's backup path; $\delta_{ij}^{uv}$ is the sum of all the demands that use link $l(i,j)$ on the active path and link $l(u,v)$ on the backup path; $F_{ij}$ represents the total amount of bandwidth reserved for the demands in the set $A_{ij}$ that use the link $l(i,j)$ on the active path; $G_{UV}$ represents the total amount of bandwidth reserved for backup path demands (in the set $B_{UV}$) whose backup paths use link $l(i,j)$, and $R_{UV}$ represents the residual bandwidth of link $l(U,V)$ and is equivalent to $(C_{ij}-F_{ij}-G_{UV})$, where $C_{ij}$ is the total capacity of the links.

15. The invention as recited in claim 9, wherein step (c) generates usage costs based on partial information for failure of a single link of the plurality of links to route a current demand b, wherein the usage cost $\theta_{ij}^{uv}$ of link $l(i,j)$ with $l(u,v)$ is $$\theta_{ij}^{uv} = \begin{cases} 0 & \text{if } F_{ij} + b \leq G_{uv} \text{ and} \\ & (i,j) \neq (u,v) \\ F_{ij} + b - G_{uv} & \text{if } F_{ij} + b > G_{uv} \text{ and } R_{uv} \geq \\ & F_{ij} + b - G_{uv} \text{ and } (i,j) \neq (u,v) \\ \infty & \text{Otherwise} \end{cases}$$

where $A_{ij}$ represents the set of demands that use link $l(U,V)$ for each demand's active path and the set $B_{UV}$ represents the set of demands that use link $l(i,j)$ for each demand's backup path; $\delta_{ij}^{UV}$ is the sum of all the demands that use link $l(i,j)$ on the active path and link $l(u,v)$ on the backup path; $F_{ij}$ represents the total amount of bandwidth reserved for the demands in the set $A_{ij}$ that use the link $l(i,j)$ on the active path; $G_{UV}$ represents the total amount of bandwidth reserved for backup path demands (in the set $B_{UV}$) whose backup paths use link $l(U,V)$, and $R_{UV}$ represents the residual bandwidth of link $l(U,V)$.

16. The invention as recited in claim 9, wherein step (c) generates usage costs based step (c) generates usage costs based on complete information for failure of either a single node of the plurality of nodes or a single link of the plurality of links to route a current demand b, wherein the usage cost $\theta_{ij}^{uv}$ of link $l(i,j)$ with $l(u,v)$ is:

$$\theta_{ij}^{uv} = \begin{cases} 0 & \text{if } \sum_{(j,k)\in E} \delta_{jk}^{uv} + b \leq \\ & G_{uv} \text{ and } (i,j) \neq (u,v) \\ \sum_{(j,k)\in E} \delta_{jk}^{uv} + b - G_{uv} & \text{if } \sum_{(j,k)\in E} \delta_{ij}^{uv} + b > G_{uv} \\ & R_{uv} \geq \sum_{(j,k)\in E} \delta_{jk}^{uv} + \\ & b - G_{uv} \text{ and} \\ & (i,j) \neq (u,v) \\ \infty & \text{Otherwise} \end{cases}$$

where $A_{ij}$ represents the set of demands that use link $l(i,j)$ for each demand's active path and the set $B_{UV}$ represents the set of demands that use link $l(U,V)$ for each demand's backup path; $\delta_{ij}^{uv}$ is the sum of all the demands that use link $l(i,j)$ on the active path and link $l(u,v)$ on the backup path; $F_{ij}$ represents the total amount of bandwidth reserved for the demands in the set $A_{ij}$ that use the link $l(i,j)$ on the active path; $G_{UV}$ represents the total amount of bandwidth reserved for backup path demands (in the set $B_{UV}$) whose backup paths use link l(U,V), and $R_{UV}$ represents the residual bandwidth of link l(U,V) and is equivalent to $(C_{ij}-F_{ij}-G_{ij})$, where $C_{ij}$ is the total capacity of the links.

17. The invention as recited in claim 9, wherein step (c) generates usage costs based step (c) generates usage costs based on partial information for failure of either a single node of the plurality of nodes or a single link of the plurality of links to route a current demand b, wherein the usage cost $\theta_{ij}^{uv}$ of link l(i,j) with l(u,v) is:

$$\theta_{ij}^{uv} = \begin{cases} 0 & \text{if } \sum_{(j,k) \in E} F_{jk} + b \leq G_{uv} \\ & \text{and } (i, j) \neq (u, v) \\ \sum_{(j,k) \in E} F_{jk} + b - G_{uv} & \text{if } \sum_{(j,k) \in E} F_{jk} + b > G_{uv} \\ & \text{and } R_{uv} \geq F_{ij} + b - G_{uv} \\ & \text{and } (i, j) \neq (u, v) \\ \infty & \text{Otherwise} \end{cases}$$

where $A_{ij}$ represents the set of demands that use link l(i, j) for each demand's active path and the set $B_{UV}$ represents the set of demands that use link l(i,j) for each demand's backup path; $\delta_{ij}^{uv}$ is the sum of all the demands that use link l(i, j) on the active path and link l(u, v) on the backup path; $F_{ij}$ represents the total amount of bandwidth reserved for the demands in the set $A_{ij}$ that use the link l(i, j) on the active path; $F_{jk}$ represents total amount of bandwidth reserved for the demands in set $A_{jk}$ that use link l(k,j) on the active paths $G_{UV}$ represents the total amount of bandwidth reserved for backup path demands (in the set $B_{UV}$) whose backup paths use link l(U,V), and $R_{UV}$ represents the residual bandwidth of link l(U,V).

18. The invention as recited in claim 1, wherein the method is implemented by a processor of a route server coupled to the plurality of nodes and he plurality of links, wherein the network is a packet network.

19. The invention as recited in claim 1, wherein the method is implemented by a processor of one or more of the plurality of nodes, wherein the network is a packet network.

20. Apparatus for routing data through a network having a plurality of nodes interconnected by a plurality of links represented by a graph, comprising:
a network signaling module that receives a path request for routing the data between a source node and a destination node in the network based on a demand;
a first processor module, coupled to the network signaling module, that reverses the links in the graph to generate paths from the destination node to nodes along reverse paths to the source node; and
a second processor module performing shortest-path computations for portions of the reverse paths to generate weights for potential active-path links, each weight of a link in a reverse path based on a number of reverse paths in which the link is included; and
wherein the second module repeats the shortest-path computations for the graph from the destination to the source using the weighted links to generate an active path satisfying the path request, wherein each link in the active path has a defined back-up path.

21. The invention of claim 20, further comprising a route server that routes the data using the active path.

22. The invention of claim 21, wherein a router routes the data through one of the defined backup paths in response to a failure in the active path.

23. The invention of claim 20, wherein each node in the active path other than the source and destination nodes has a defined back-up path.

24. The invention as recited in claim 20, wherein the second module selects each link of the active path to generate a backup path to back up for a failure of a single link.

25. The invention as recited in claim 20, wherein the second module selects each link of the active path to generate a backup path to back up for a failure of a single element.

26. The invention as recited in claim 25, wherein the second module selects each link in the active path to generate a backup path to back up for a failure of a each node in the active path and a failure of a last link in the active path.

27. The invention as recited in claim 26, wherein to generate a backup path to back up for a failure of each node selects a backup link for each link incident on the failed node.

28. The invention as recited in claim 20, wherein each weight of a link includes usage costs based on either complete, partial, or minimal network information.

29. The invention as recited in claim 28, wherein each link weight is a sum of usage costs for each back-up path link based on a number of back-up paths for which the back-up path link is employed to back-up an active path link.

30. The invention as recited in claim 28, wherein each link weight is a sum of usage costs for backup links based on a number of demands for which each back-up link is employed.

31. The invention as recited in claim 28, wherein usage costs account for intra-demand sharing of link capacity.

32. The invention as recited in claim 31, wherein, to account for intra-demand sharing, a vector for each node maintains the amount of demand for backup paths of previously routed demands, each usage cost being an incremental usage cost based on demand reserved for each backup path on a link accounted for with a corresponding element of the vector for the link.

33. The invention as recited in claim 28, wherein usage costs are based on complete information for failure of a single link of the plurality of links, and wherein the usage cost $\theta_{ij}^{uv}$ of link l(i,j) with l(u,v) is $$\theta_{ij}^{uv} = \begin{cases} 0 & \text{if } \delta_{ij}^{uv} + b \leq G_{uv} \\ & \text{and } (i, j) \neq (u, v) \\ \delta_{ij}^{uv} + b - G_{uv} & \text{if } \delta_{ij}^{uv} + b > G_{uv} \text{ and} \\ & R_{uv} \geq \delta_{ij}^{uv} + b - G_{uv} \\ & \text{and } (i, j) \neq (u, v) \\ \infty & \text{Otherwise} \end{cases}$$

where $A_{ij}$ represents the set of demands that use link l(i, j) for each demand's active path and the set $B_{UV}$ represents the set of demands that use link l(U,V) for each demand's backup path; $\delta_{ij}^{uv}$ is the sum of all the demands that use link l(i, j) on the active path and link l(u, v) on the backup path; $F_{ij}$ represents the total amount of bandwidth reserved for the demands in the set $A_{ij}$ that use the link l(i, j) on the active path; $G_{UV}$ represents the total amount of bandwidth reserved for backup path demands (in the set $B_{UV}$) whose backup paths use link l(U,V), and $R_{UV}$ represents the residual bandwidth of link l(U,V) and is equivalent to $(C_{ij}-F_{ij}-G_{ij})$, where $C_{ij}$ is the total capacity of the links.

34. The invention as recited in claim 28, wherein usage costs are based on partial information for failure of a single link of the plurality of links to route a current demand b, and wherein the usage cost $\theta_{ij}^{uv}$ of link l(i,j) with l(u,v) is:

$$\theta_{ij}^{uv} = \begin{cases} 0 & \text{if } F_{ij} + b \leq G_{uv} \text{ and} \\ & (i, j) \neq (u, v) \\ F_{ij} + b - G_{uv} & \text{if } F_{ij} + b > G_{uv} \text{ and } R_{uv} \geq \\ & F_{ij} + b - G_{uv} \text{ and } (i, j) \neq (u, v) \\ \infty & \text{Otherwise} \end{cases}$$

where $A_{ij}$ represents the set of demands that use link l(i, j) for each demand's active path and the set $B_{UV}$ represents the set of demands that use link l(U,V) for each demand's backup path; $\delta_{ij}^{uv}$ is the sum of all the demands that use link l(i, j) on the active path and link l(u, v) on the backup path; $F_{ij}$ represents the total amount of bandwidth reserved for the demands in the set $A_{ij}$ that use the link l(i, j) on the active path; $G_{UV}$ represents the total amount of bandwidth reserved for backup path demands (in the set $B_{UV}$) whose backup paths use link l(U,V), and $R_{ij}$ represents the residual bandwidth of link l(i,j).

35. The invention as recited in claim 28, wherein usage costs are based on complete information for failure of either a single node of the plurality of nodes or a single link of the plurality of links to route a current demand b, and wherein the usage cost $\theta_{ij}^{uv}$ of link l(i,j) with link l(u,v) is:

$$\theta_{ij}^{uv} = \begin{cases} 0 & \text{if } \sum_{(j,k)\in E} \delta_{jk}^{uv} + b \leq \\ & G_{uv} \text{ and } (i, j) \neq (u, v) \\ \sum_{(j,k)\in E} \delta_{jk}^{uv} + b - G_{uv} & \text{if } \sum_{(j,k)\in E} \delta_{ij}^{uv} + b > G_{uv} \\ & R_{uv} \geq \sum_{(j,k)\in E} \delta_{jk}^{uv} + \\ & b - G_{uv} \text{ and } \\ & (i, j) \neq (u, v) \\ \infty & \text{Otherwise} \end{cases}$$

where $A_{ij}$ represents the set of demands that use link l(i, j) for each demand's active path and the set $B_{UV}$ represents the set of demands that use link l(U,V) for each demand's backup path; $\delta_{ij}^{uv}$ is the sum of all the demands that use link l(i, j) on the active path and link ((u, v) on the backup path; $F_{ij}$ represents the total amount of bandwidth reserved for the demands in the set $A_{ij}$ that use the link l(i, j) on the active path; $G_{UV}$ represents the total amount of bandwidth reserved for backup path demands (in the set $B_{UV}$) whose backup paths use link l(U,V), and $R_{UV}$ represents the residual bandwidth of link l(U,V) and is equivalent to $(C_{ij}-F_{ij}-G_{ij})$, where $C_{ij}$ is the total capacity of the links.

36. The invention as recited in claim 28, wherein usage costs are based on partial information for failure of either a single node of the plurality of nodes or a single link of the plurality of links to route a current demand b, wherein the usage cost $\theta_{ij}^{uv}$ of link l(i,j) with link l(u,v) is:

$$\theta_{ij}^{uv} = \begin{cases} 0 & \text{if } \sum_{(j,k)\in E} F_{jk} + b \leq G_{uv} \\ & \text{and } (i, j) \neq (u, v) \\ \sum_{(j,k)\in E} F_{jk} + b - G_{uv} & \text{if } \sum_{(j,k)\in E} F_{jk} + b > G_{uv} \\ & \text{and } R_{uv} \geq F_{ij} + b - G_{uv} \\ & \text{and } (i, j) \neq (u, v) \\ \infty & \text{Otherwise} \end{cases}$$

where i, j, u, and v are nodes of the plurality of nodes; $A_{ij}$ represents the set of demands that use link l(i,j) for each demand's active path and the set $B_{UV}$ represents the set of demands that use link l(U,V) for each demand's backup path; $\delta_{ij}^{uv}$ is the sum of all the demands that use link l(i,j) on the active path and link l(u, v) on the backup path; $F_{jk}$ represents total amount of bandwidth reserved for the demands in set $A_{jk}$ that use link l(k,j) on the active path $F_{ij}$ represents the total amount of bandwidth reserved for the demands in the set $A_{ij}$ that use the link l(i,j) on the active path; $G_{UV}$ represents the total amount of bandwidth reserved for backup path demands (in the set $B_{UV}$) whose backup paths use link l(U,V), and $R_{UV}$ represents the residual bandwidth of link l(U,V).

37. The invention as recited in claim 20, wherein the apparatus is included in a processor of a route server coupled to the plurality of nodes and he plurality of links, wherein the network is a packet network.

38. The invention as recited in claim 20, wherein the apparatus is included in one of the plurality of nodes, wherein the network is a packet network.

39. The invention as recited in claim 20, wherein the apparatus is included in a either an MPLS or an IP packet network.

40. A computer-readable medium having stored thereon a plurality of instructions, the plurality of instructions including instructions which, when executed by a processor, cause the processor to implement a method for routing data through a network having a plurality of nodes interconnected by a plurality of links represented by a graph, the method comprising the steps of:
(a) receiving a path request for routing the data between a source node and a destination node in the network based on a demand;
(b) reversing the links in the graph to generate paths from the destination node to nodes along reverse paths to the source node;
(c) performing shortest-path computations for portions of the reverse paths to generate weights for potential active-path links, wherein each weight of a link in a reverse path is based on a number of reverse paths in which the link is included; and
(d) repeating the shortest-path computations of step (c) for the graph from the destination to the source using the weighted links to generate an active path satisfying the path request, wherein each link in the active path has a defined back-up path.

* * * * *